(12) United States Patent
Matsuura et al.

(10) Patent No.: US 7,610,129 B2
(45) Date of Patent: Oct. 27, 2009

(54) REMOTE VEHICLE STARTER AND METHOD FOR REMOTELY STARTING VEHICLE

(75) Inventors: Akira Matsuura, Hyogo (JP); Minoru Yoshimura, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 31 days.

(21) Appl. No.: 11/294,454

(22) Filed: Dec. 6, 2005

(65) Prior Publication Data
US 2006/0271247 A1    Nov. 30, 2006

(30) Foreign Application Priority Data
Dec. 6, 2004    (JP)    ............... P2004-352715
Dec. 1, 2005    (JP)    ............... P2005-347410

(51) Int. Cl.
*G01M 19/00*    (2006.01)
(52) U.S. Cl. ............. 701/36; 701/1; 701/2; 701/29; 701/31; 701/45; 701/46; 701/47; 340/870.69; 340/425.5; 340/426.13
(58) Field of Classification Search ............. 701/1, 701/2, 29, 31, 36, 45–47; 340/870.39, 425.5, 340/426.13
See application file for complete search history.

(56) References Cited
U.S. PATENT DOCUMENTS
2006/0091848 A1 *    5/2006    Braun et al. .............. 320/104

FOREIGN PATENT DOCUMENTS

| JP | A-04-091369 | | 3/1992 |
|---|---|---|---|
| JP | 06137240 A | * | 5/1994 |
| JP | A 06-137240 | | 5/1994 |
| JP | A-08-021343 | | 1/1996 |
| JP | 09303020 A | * | 11/1997 |
| JP | A 09-303020 | | 11/1997 |
| JP | A 09-322265 | | 12/1997 |
| JP | A-09-329075 | | 12/1997 |
| JP | 10131569 A | * | 5/1998 |
| JP | A 10-131569 | | 5/1998 |
| JP | 2000025573 A | * | 1/2000 |
| JP | A 2000-25573 | | 1/2000 |
| JP | A 2001-049917 | | 2/2001 |
| JP | 2002130034 A | * | 5/2002 |
| JP | A 2002-130034 | | 5/2002 |
| JP | A 2004-068626 | | 3/2004 |
| JP | A-2004-124846 | | 4/2004 |
| JP | A-2006-009650 | | 1/2006 |

* cited by examiner

*Primary Examiner*—Khoi Tran
*Assistant Examiner*—Nikhil Sriraman
(74) *Attorney, Agent, or Firm*—Oliff & Berridge, PLC (57) ABSTRACT

A remote vehicle starter allows a user to start an engine of a vehicle remotely. The starter includes a parameter-signal generating unit, a receiving unit, an engine starting unit and a controller. The parameter-signal generating unit generates a vehicle-parameter signal on a basis of a power source. The receiving unit receives an instruction for starting the engine. The engine starting unit starts the engine when receives the instruction for starting the engine from the receiving unit and receiving the vehicle-parameter signal satisfying a starting permission condition from the parameter-signal generating unit. The controller controls an engine starting by the engine starting unit, in accordance with a power source voltage value of the power source.

3 Claims, 9 Drawing Sheets

REMOTE VEHICLE STARTER AND METHOD FOR REMOTELY STARTING VEHICLE

This application is based upon and claims the benefit of priority from Japanese Patent Application No. 2004-352715 filed on Dec. 6, 2004 and Japanese Patent Application No. 2005-347410 filed on Dec. 1, 2005, the entire contents of which are incorporated herein by reference.

BACKGROUND OF THE INVENTION

1. Field of the Invention

The invention relates to a remote vehicle starter and, particularly to a remote vehicle starter for starting an engine of a vehicle remotely and wirelessly.

2. Description of the Related Art

Recently, a remote vehicle starter has been practically used for starting an engine of a vehicle, remotely controlling by a transmitter. This remote vehicle starter establishes various starting permission conditions considering the safety or security when remotely starting the vehicle. For example, there is provided a device that prevents the engine from starting if a door is opened or a brake lamp is lighted when an instruction for starting the engine is received from the transmitter (See JP 2000-25573 A).

A microcomputer judges the engine starting permission conditions. Concretely, the microcomputer inputs and judges information received from a sensor, which will become the engine starting permission condition, according to a voltage level. Accordingly, mainly in the winter time, if a battery voltage decreases, an output voltage of a sensor input to the microcomputer are also lowered, so that the microcomputer may misjudge the information in the remote starting.

For example, a door curtsy switch that detects the opening and closing state of the door, in general, is set to OFF when the door is closed and to ON when the door is opened. An output voltage of the door curtsy switch is formed by dividing a battery voltage, for example, it is set to 7V when the door curtsy switch is at OFF and to 0V when the door curtsy switch is at ON. By comparing the output voltage of the door curtsy switch with a threshold value in hardware, the microcomputer, for example, judges whether the door is opened or closed by judging as H state if the output voltage of the door curtsy switch is 3.5V or higher and as L state if it is 1.5V or lower. However, if the output voltage of the sensor becomes a voltage between threshold value voltages that enables judging H/L state as the battery voltage (the power source voltage) goes down, the H/L state of the microcomputer is judged as unfixed, whereby the wrong opening or closing state may be judged.

SUMMARY OF THE INVENTION

As described above, when a power source voltage (a battery voltage or a voltage of battery via a diode) decreases, a vehicle-parameter signal, which is a starting permission condition such as a door curtsy switch, becomes an unfixed voltage. Therefore, there arises a problem in that an engine may be started by mistake in spite of the condition that the engine must not be started, when an instruction for starting the engine is transmitted from a transmitter.

The invention provides a remote vehicle starter, which controls an engine starting in accordance with a power source voltage value and can start the engine safely.

According to one embodiment of the invention, a remote vehicle starter allows a user to start an engine of a vehicle remotely. The starter includes a parameter-signal generating unit, a receiving unit, an engine starting unit and a controller. The parameter-signal generating unit generates a vehicle-parameter signal on a basis of a power source. The receiving unit receives an instruction for starting the engine. The engine starting unit starts the engine when receives the instruction for starting the engine from the receiving unit and receiving the vehicle-parameter signal satisfying a starting permission condition from the parameter-signal generating unit. The controller controls an engine starting by the engine starting unit, in accordance with a power source voltage value of the power source.

According to this configuration, the remote vehicle starter controls the engine starting in accordance with a power source voltage value based on which the vehicle-parameter signal is generated. Thus, if a voltage of a vehicle-parameter signal decreases due to decrease of the power source voltage value and it becomes impossible to judge the engine start condition properly, the remote vehicle starter can prohibit the engine from starting. Accordingly, the remote vehicle starter can start the engine safely.

DETAILED DESCRIPTION OF EMBODIMENTS OF THE INVENTION

Hereinafter, principle of one embodiment of the present invention will be described in detail with reference to the accompanying drawings.

Figure 1:
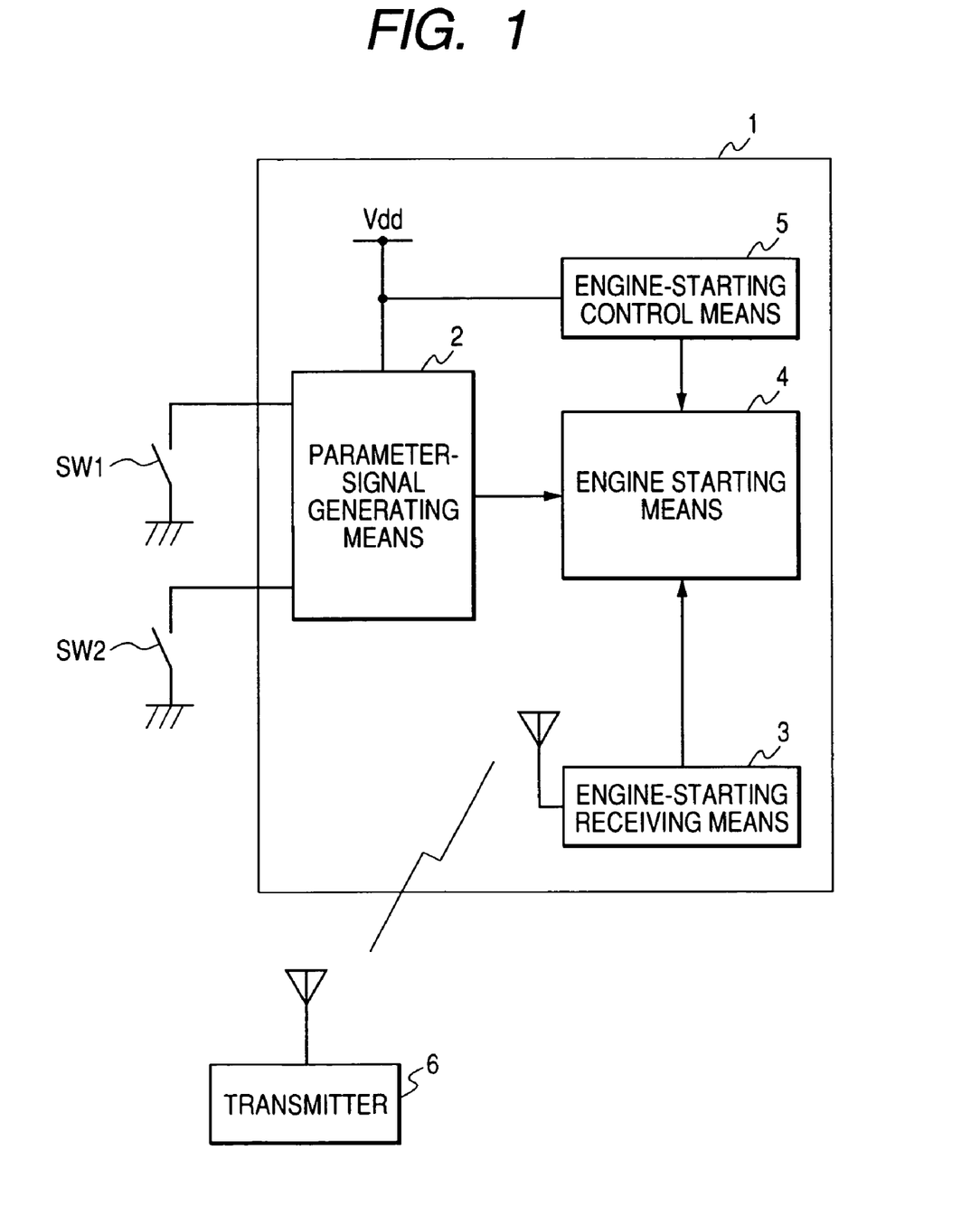
FIG. 1 is a schematic view of a remote vehicle starter.

FIG. 1 is a schematic view of a remote vehicle starter. As shown in the figure, the remote vehicle starter 1 has a parameter-signal generating means 2, an engine-starting receiving means 3, an engine starting means 4 and an engine-starting control means 5. A transmitter 6 includes a switch for instructing the starting and stopping of the engine and instructs to start and stop the engine by wirelessly communicating with the remote vehicle starter 1 in accordance with a user's operation of the switches. Furthermore, the transmitter 6 may be portable transmitting terminals such as an antitheft device for vehicle or keyless entry device as well as the transmitter for the remote vehicle starter so long as the transmitter 6 is configured to instruct to start and stop the engine.

Switches SW 1 and SW 2 indicating, for example, the opening or closing state of a door or a hood, which becomes engine starting permission conditions, are connected to the parameter-signal generating means 2. The parameter-signal generating means 2 outputs the opening or closing state of the switches SW 1 and SW 2 as a voltage value (vehicle-parameter signal) on the basis of the power source voltage Vdd supplied.

The engine-starting receiving means 3 receives the instruction for starting the engine from the transmitter 6.

The engine starting means 4 executes starting the engine if the engine-starting receiving means 3 receives the instruction for starting the engine from the transmitter 6 and the vehicle-parameter signal generated in the parameter-signal generating means 2 satisfies the engine starting permission condition.

The engine-starting control means 5 controls the engine starting by the engine-starting means 4 in response to the power voltage Vdd. For example, if the power source voltage Vdd decreases, the voltage of the vehicle-parameter signal generated in accordance with the power source voltage Vdd goes down, whereby the engine starting means 4 is unable to judge the vehicle parameter properly. Therefore, when the power source voltage Vdd becomes below a predetermined voltage, the engine-starting control means 5 prohibits the engine starting means 4 from starting the engine even though the instruction for starting the engine is transmitted from the transmitter 6 and the vehicle-parameter signal satisfies the starting permission condition.

As described above, the engine starting is controlled in accordance with the power source voltage Vdd, which is the base of the vehicle-parameter signal. Accordingly, if the voltage of the vehicle-parameter signal decreases due to the decrease of the power source voltage Vdd and the starting permission condition cannot be judged properly, it is possible to prohibit the engine from being started and thus, the engine can be started safely.

Next, a first embodiment of the present invention will be described in detail with reference to the drawings.

Figure 2:
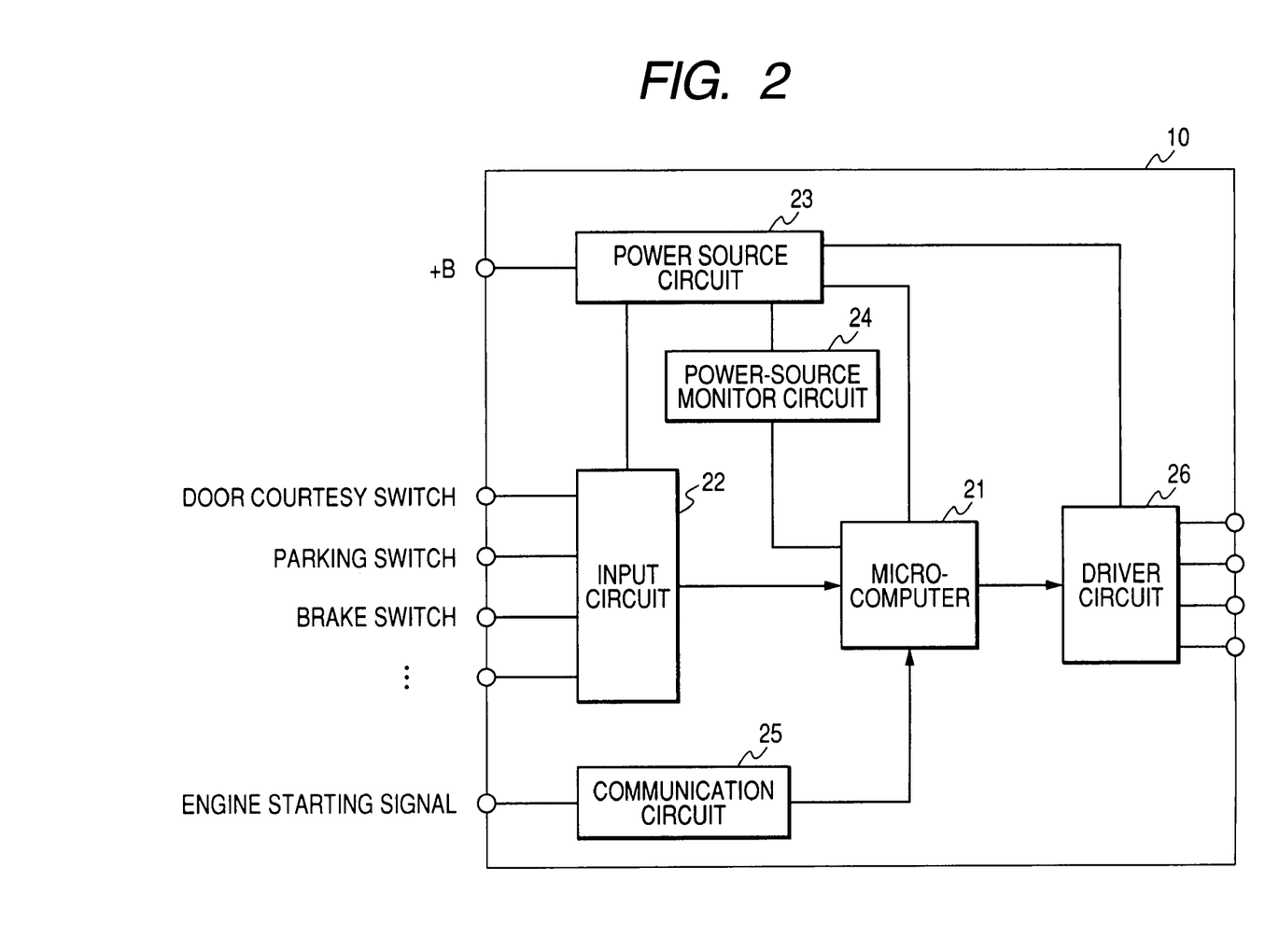
FIG. 2 shows an example of a system configuration of a remote vehicle starter in accordance with a first embodiment.

FIG. 2 shows an example of a system configuration of a remote vehicle starter according to the first embodiment of the present invention. As shown in the figure, a remote vehicle starter 10 has a microcomputer 21, an input circuit 22, a power source circuit 23, a power-source monitor circuit 24, a communication circuit 25 and a driver circuit 26. The remote vehicle starter 10 receives the instruction for starting and stopping an engine by wirelessly communicating with a transmitter, and controls the engine starting and stopping.

The microcomputer 21 is input the power source voltage from the power source circuit 23 to operate. The microcomputer 21 controls the entire remote vehicle starter 10 with an OS (Operating System) or an application program stored in a storage device of a ROM (Read Only Memory) or a RAM (Random Access Memory), which is not shown in the figure. In addition, the storage device of the ROM or the RAM may be built in the microcomputer 21.

The vehicle-parameter signal, which is the starting permission condition of the engine, is input from the input circuit 22 to the microcomputer 21. In addition, the monitoring result of the power source voltage of the battery is input from the power-source monitor circuit 24 to the microcomputer 21. Furthermore, the instruction for starting the engine and the instruction for stopping the engine are input from the communication circuit 25 to the microcomputer 21. The microcomputer 21 processes these input signals and outputs necessary processing results to the driver circuit 26.

The input circuit 22 is connected to an external sensor. The sensor includes a door curtsy switch, a parking switch, a brake switch, a hood switch, a trunk switch and the like. The input circuit 22 outputs ON/OFF state of each switch, which is connected thereto, as a voltage value (parameter signal of H/L state) to the microcomputer 21. The power source voltage of the battery is input from the power source circuit 23 to the input circuit 22 and the input circuit 22 generates the vehicle-parameter signal, which indicates ON/OFF state of each switch, on the basis of the power source voltage.

Figure 3:
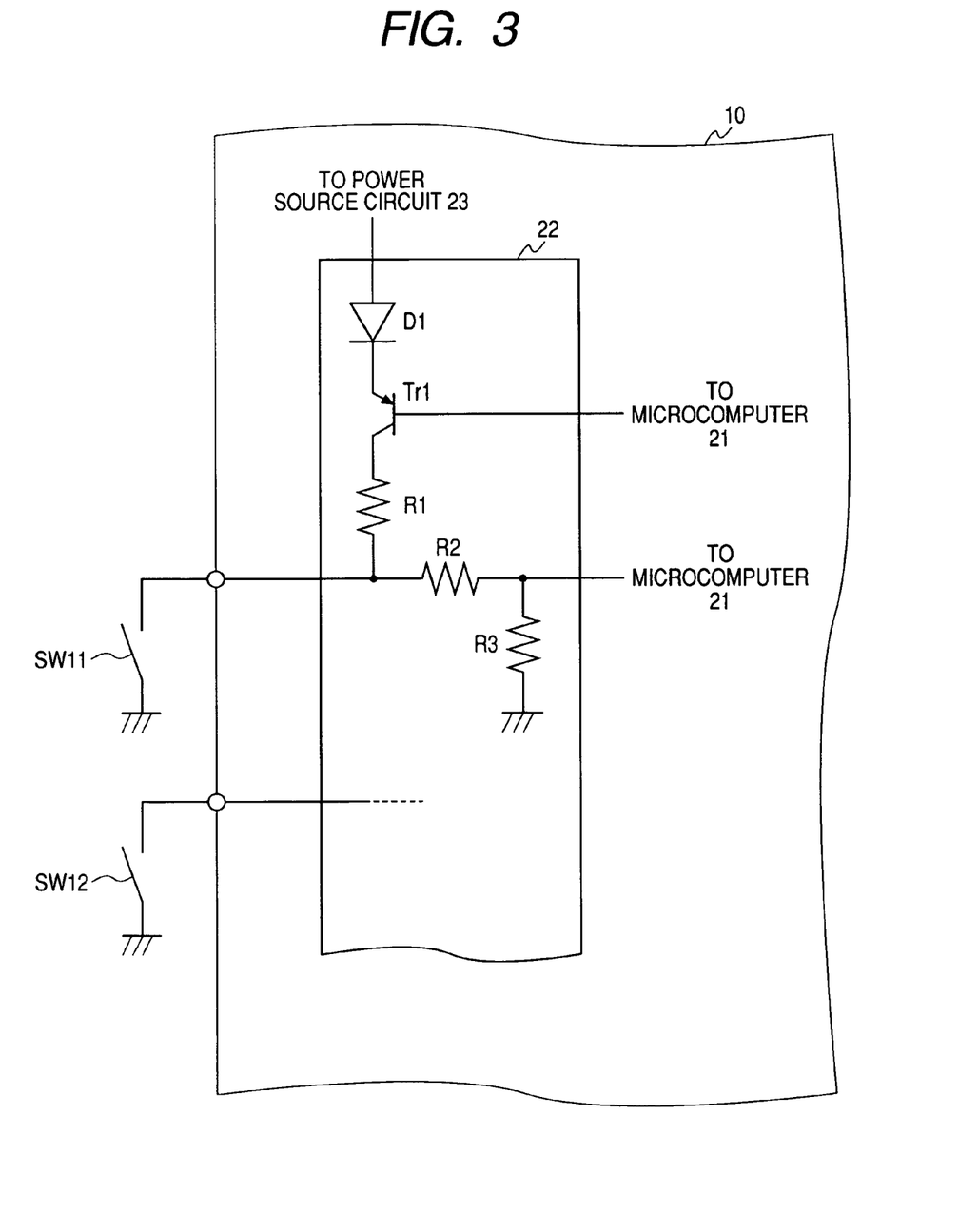
FIG. 3 is a detailed circuit diagram of an input circuit.

FIG. 3 is a detailed circuit diagram of an input circuit. The door curtsy switch SW 11 and the parking switch SW 12 shown in FIG. 3, respectively, indicate the door curtsy switch and the parking switch shown in FIG. 2, and the other switches are omitted. As shown in the figure, the input circuit 22 has a diode D1, a transistor Tr1 and resistances R1 to R3.

An anode of the diode D1 is connected to the power source circuit 23, that is, to the power source of the battery. A cathode of the diode is connected to an emitter of the PNP transistor Tr1. A base of the transistor Tr1 is connected to, for example, a digital port of the microcomputer 21 and is input a pulse signal. The resistances R1 to R3 connected in series are connected between a collector of the transistor Tr1 and the ground. Connected to a connecting point between the resistance R1 and the resistance R2 is the other end of the door curtsy switch SW 11 one end of which is connected to the ground. For example, the digital port of the microcomputer 21 is connected to a connecting point between the resistance R2 and the resistance R3. In addition, the input circuit 22 has a plurality of same circuits as above, although not shown in the figure, which are connected to respective switches (sensors) coupled with the input circuit 22, respectively.

The power source voltage of the battery supplied to the power source circuit 23 is applied to the resistances R1 to R3 connected in series via the diode D1 and the transistor Tr1. The door curtsy switch SW 11 changes the voltage dividing ratio of the resistances R1 to R3 by means of the operation of ON/OFF and changes the voltage value output to the microcomputer 21. As described above, the pulse is input from the microcomputer 21 to the transistor 21. The transistor Tr1 is turned on/off by the pulse so that current does not always flow through the resistances R1 to R3, in order to reduce power consumption.

As described above, the input circuit 22 generates the vehicle-parameter signal, which indicates the ON/OFF state on the basis of voltage obtained by dividing the power source voltage of the battery in the power source circuit 23, that is, the power source voltage of the battery in the power source circuit 23.

Referring to FIG. 2 again, +B voltage of the battery mounted on a vehicle is input to the power source circuit 23. The power source circuit 23 allows the voltage of the battery to be supplied stably to the respective circuits.

As described above, since the vehicle-parameter signal is generated on the basis of the power source voltage of the battery, when the power source voltage decreases, the voltage of the vehicle-parameter signal also decreases. Then, it is impossible that the microcomputer 21 properly judges whether the parameter signal is in L state or H state. Consequently, the power-source monitor circuit 24 detects the power source voltage at which the vehicle-parameter signal is not properly judged by the microcomputer 21, and outputs the detection result to the microcomputer 21. That is, the power-source monitor circuit 24 monitors the power source voltage of the battery in the power source circuit 23 to output the signal representing the monitoring result to the microcomputer 21. The microcomputer 21 executes the control of the engine starting in response to the monitoring result from the power-source monitor circuit 24. For example, even though the instruction for starting the engine is transmitted from the transmitter, when the monitoring result representing that the power source voltage of the battery is decreased to a predetermined voltage is output from the power-source monitor circuit 24, the microcomputer 21 does not execute the engine starting. In addition, a margin may be allowed, for example, by setting the power source voltage of the battery monitored to high value such as 8V, considering the error of the circuit element.

Figure 4:
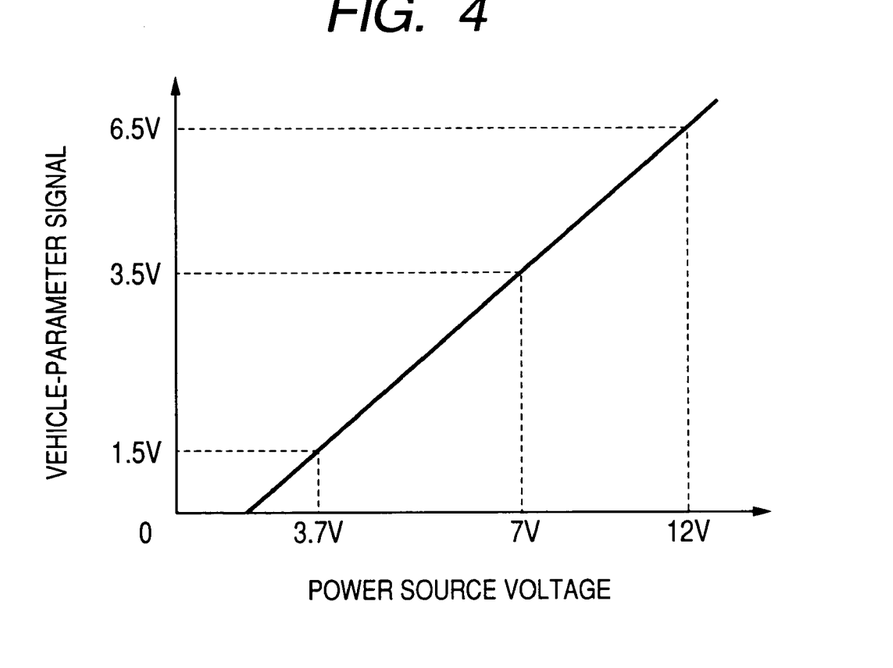
FIG. 4 shows the relationship between a power source voltage of a battery and a voltage of a vehicle-parameter signal input to a microcomputer when a switch is off (a door is closed).

FIG. 4 shows a relationship between a power source voltage of a battery and a voltage of a vehicle-parameter signal input to a microcomputer when a switch is in OFF state (a door closed). The graph of the figure shows the relationship between the power source voltage of the battery and the vehicle parameter when the resistance values of the resistances R1 to R3 are 560Ω, 100 kΩ and 150 kΩ, respectively, the voltage drop of the diode D1 is 6V, and the voltage drop of the transistor Tr1 is 0.4V in the input circuit 22 shown in FIG. 3. In FIG. 4, the horizontal axis indicates the power source voltage (+B) of the battery and the vertical axis indicates the vehicle-parameter signal input to the microcomputer 21.

In case where the power source voltage of the battery is 12V, if the door is closed and the door curtsy switch SW 11 is opened, the voltage input to the microcomputer 21 becomes 6.5V as shown in FIG. 4. When the power source voltage of the battery is 7V, the door is closed and the door switch SW 11 is opened, then the voltage input to the microcomputer 21 becomes 3.5V as shown in FIG. 4.

The input of the microcomputer 21 includes a voltage incapable of judging the H/L state properly. For example, since the microcomputer 21, which judges 3.5V or higher as H state and 1.5V or lower as L state in hardware, cannot judge whether the signal of the voltage of higher than 1.5V and lower than to 3.5V is in either H state or in L state, the voltage signal becomes unfixed. That is, the microcomputer is in the state where it is impossible to know which H state or L state will be output. This depends upon the performance of the microcomputer. If the power source voltage is below 7V when there is provided the relationship between the power source voltage and the vehicle-parameter signal as shown in FIG. 4, the microcomputer will be unable to judge the vehicle-parameter signal input properly. Therefore, the power-source monitor circuit 24 monitors the power source voltage of the battery at which the vehicle-parameter signal is not properly judged by the microcomputer 21. Furthermore, in FIG. 4, the power-source monitor circuit 24 may notify the monitoring result to the microcomputer 21 when the power source voltage is below 7V. However, margin may be allowed by setting the power source voltage of the battery monitored to high value such as 8V considering the error of the circuit element.

Figure 5:
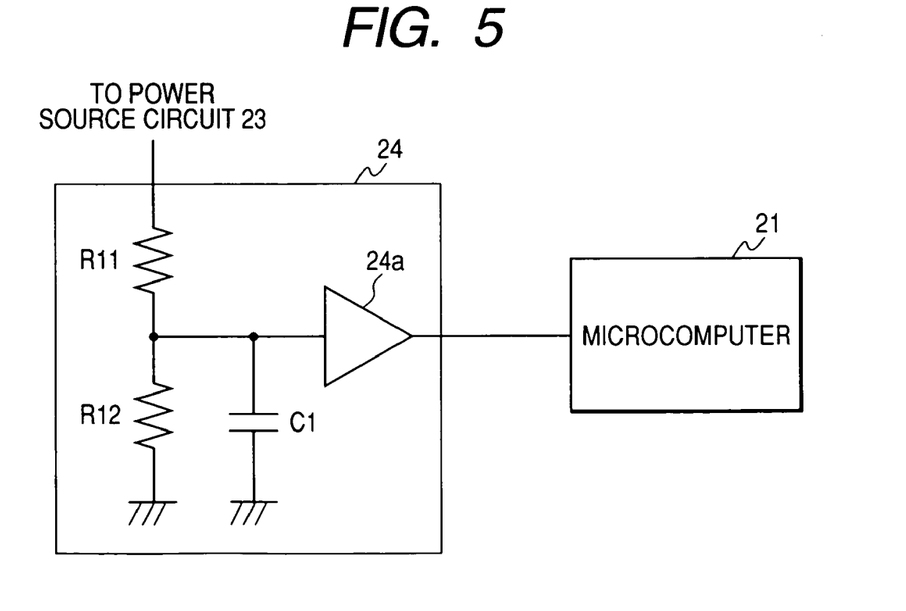
FIG. 5 is a detailed circuit diagram of a power-source monitor circuit.

Details of the power-source monitor circuit 24 will be described.

FIG. 5 is a detailed circuit diagram of the power-source monitor circuit. As shown in the figure, the power-source monitor circuit 24 has the resistances R11 and R12, a capacitor C1, a comparator 24a and a reference voltage generating section 24b.

The resistances R11 and R12 are connected in series to each other. One end of the resistance R11 is connected to the power source circuit 23 and one end of the resistance R12 is connected to the ground. The capacitor C1 is connected between the contacting point between the resistances R11 and R12, and the ground. The input of the comparator 24a is connected to the contacting point between the resistances R11 and R12, and the output is connected to the microcomputer 21. In addition, the input of the comparator 24a is connected to the reference voltage generating section 24b. The reference voltage generating section 24b generates a fixed reference voltage and outputs it to the comparator 24a.

The power source voltage of the battery in the power source circuit 23 is divided by the resistance R11 and R12, and then, it is input to the comparator 24a. The capacitor C1 removes a noise of the power source voltage of the battery to be divided. The comparator 24a, for example, outputs the signal of H state to the microcomputer if the divided power source voltage of the battery is lower than the reference voltage when comparing the value of the divided power source voltage with the reference voltage generated by the reference voltage generating section 24b. If the signal output from the comparator 24a is in H state, the microcomputer 21 judges that it cannot judge the vehicle-parameter signal output from the input circuit 22 properly, and does not execute the engine starting in spite of the instruction for starting the engine from the transmitter.

The value with which the comparator 24a compares the value of the power source voltage supplied to the power source circuit is set to the value of the voltage obtained by dividing by the resistances R11 and R12. By this configuration the power source voltage at which the vehicle-parameter signal is not judged by the microcomputer 21. Thereby, the microcomputer 21 judges whether or not it is possible to start the engine, according to the voltage obtained by dividing the power source voltage of the power source circuit 23, that is, the power source voltage of the battery supplied from the power source circuit 23. Furthermore, as described above, margin may be allowed by setting the value compared with the power source voltage to high value, considering the error of the circuit element.

Furthermore, as described above, although the power-source monitor circuit 24 monitors the power source voltage of the battery and outputs the monitoring result to the microcomputer 21 as the signal of H/L state, for example, in the case where the microcomputer 21 has a built-in A/D converter, the voltage obtained by dividing by the resistances R11 and R12 may be output to the A/D converter directly as shown in FIG. 5. In this case, the microcomputer 21 reads the value of the power source voltage of the battery with the built-in A/D converter and compares the read value with a predetermined value. Since the predetermined value compared with the power source voltage of the battery, for example, may be stored in the storage device such as ROM, RAM and the like outside or inside the microcomputer 21. The A/D converter may be provided outside the microcomputer 21, and the microcomputer may read the power source voltage of the battery from the external A/D converter and compare the read voltage with the predetermined value.

Referring to FIG. 2 again, the communication circuit 25 is connected to a wireless circuit not shown wirelessly communicating with the transmitter, which instructs to start and stop the engine. The communication circuit 25 receives from the wireless circuit data related to the instruction for starting or stopping the engine transmitted from the transmitter, and outputs the received data to the microcomputer 21. Also, the communication circuit 25 transmits the fact that it is impossible to start the engine, output from the microcomputer, to the transmitter through the wireless circuit. Furthermore, the communication circuit 25 may have a wireless circuit and wirelessly and directly communicate with the transmitter through an antenna.

The driver circuit 26 elevates driving capability of the signal output from the microcomputer 21 and outputs the signal to an external circuit. The signals include an ACC signal, an IG signal and a starter signal for starting the engine.

In addition, the signal, which indicates that it is impossible to start the engine, is also included in the signals above. These signals are output through the driver circuit 26.

Figure 6:
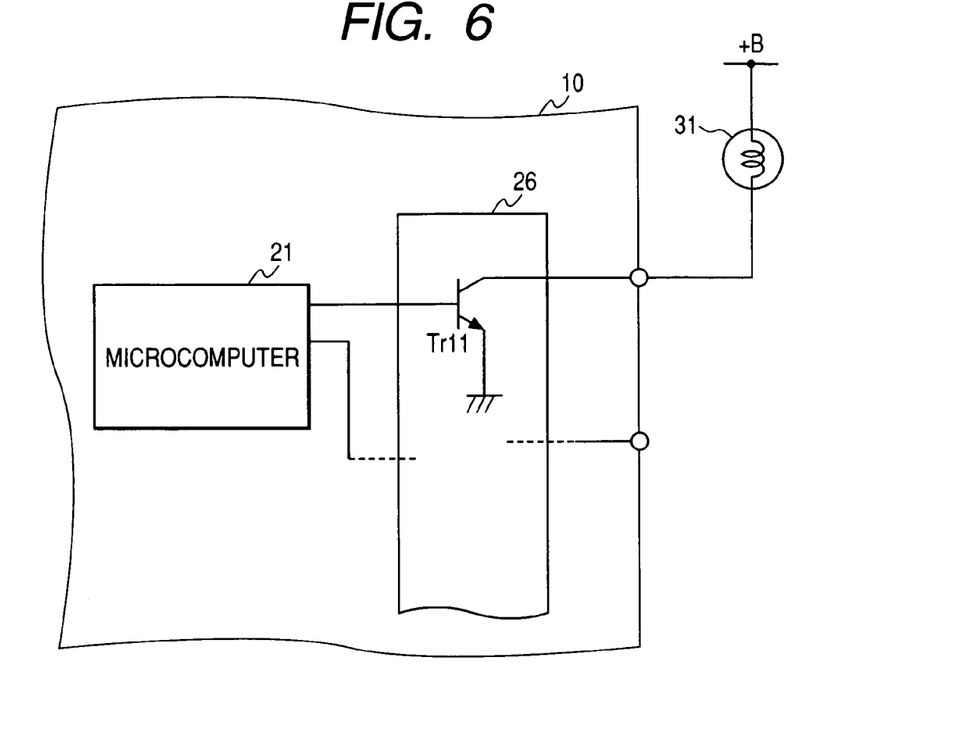
FIG. 6 is a detailed circuit diagram of a driver circuit.

FIG. 6 is a detailed circuit diagram of a driver circuit. The driver circuit 26 shown in FIG. 6 has a transistor Tr11. A hazard lamp 31 connected to the driver circuit 26 is shown in the figure.

A base of the transistor Tr11 is connected to the microcomputer 21. A collector of the transistor Tr11 is connected to the hazard lamp 31 one end of which is connected to the battery having the voltage of +B. An emitter is connected to the ground.

If a signal of H state is input to the base of the transistor Tr11, a current flows between the collector and the emitter of the transistor Tr11, so that the hazard lamp 31 is lighted. For example, when the power source voltage is decreased to a predetermined voltage, even though the instruction for starting the engine is received from the transmitter, the microcomputer 21 does not start the engine. The microcomputer 21 outputs the signal of H state, which indicates such a fact, to the driver circuit 26 and turns on the hazard lamp 31, and then, gives a notice to a user. The hazard lamp is only an example and a horn may be used. Furthermore, the driver circuit 26 has a plurality of same transistors as above although not shown and the microcomputer 21 outputs predetermined signals to the corresponding respective transistors.

Next, the function of the remote vehicle starter 10 implemented by the configuration examples of the system shown in FIG. 2 will be described.

Figure 7:
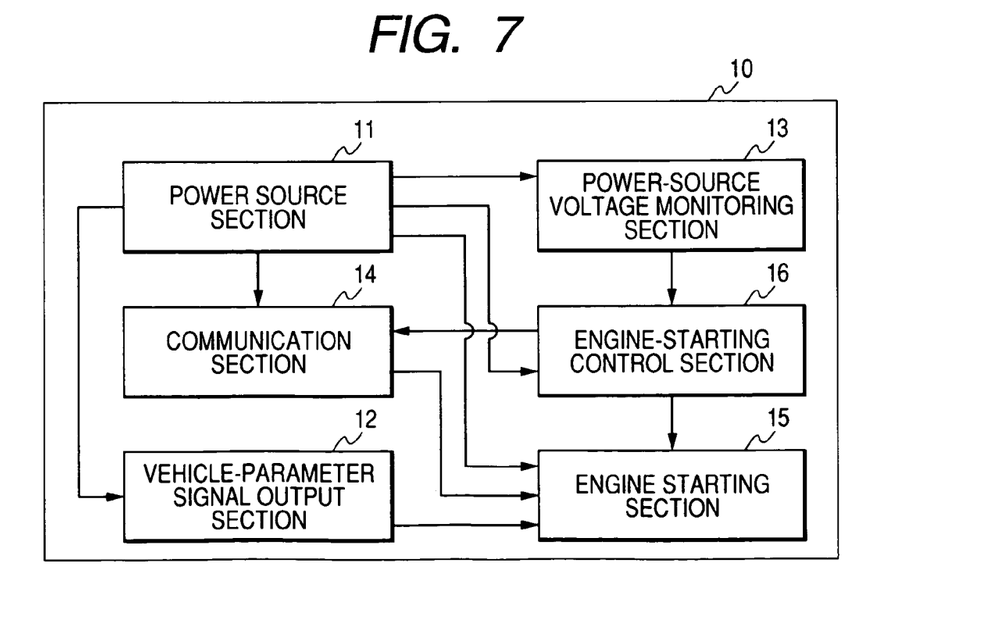
FIG. 7 is a functional block diagram of a remote vehicle starter.

FIG. 7 is a functional block diagram of a remote vehicle starter. As shown in FIG. 7, the remote vehicle starter 10 has a power source section 11, a vehicle-parameter signal output section 12, a power-source voltage monitoring section 13, a communication section 14, an engine starting section 15 and an engine-starting control section 16. In addition, respective functions of the power source section 11, the vehicle-parameter signal output section 12, the power-source voltage monitoring section 13 and the communication section 14 are implemented by the power source circuit 23, the input circuit 22, the power-source monitor circuit 24 and the communication circuit 25 shown in FIG. 2. The functions of the engine starting section 15 and the engine-starting control section 16 are implemented by the microcomputer 21.

The power source section 11 stabilizes the voltage of a battery mounted on a vehicle and supplies a power source to each unit.

The vehicle-parameter signal output section 12 accesses to sensors, which are the starting permission conditions such as a door curtsy switch, a parking switch, a brake switch, a hood switch and a trunk switch, and outputs the states of the sensors in the voltage value (as a vehicle-parameter signal) to the engine starting section 15. As described in the input circuit 22 of FIG. 2, the vehicle-parameter signal is generated on the basis of the power source voltage, and if the power source voltage of the battery is lowered, the voltage also decreases.

The power-source voltage monitoring section 13 monitors the power source voltage output from the power source section 11. The power-source voltage monitoring section 13 monitors the power source voltage of the battery when the vehicle-parameter signal becomes the voltage at which the engine starting section 15 does not judge the vehicle-parameter signal properly. The power-source voltage monitoring section 13 notifies the monitoring result to the engine-starting control section 16.

The communication section 14 wirelessly communicates with the transmitter, which instructs to start or stop the engine.

The engine starting section 15 controls starting or stopping the engine in response to the instruction received from the transmitter by the communication section 14 and the vehicle-parameter signal output from the vehicle-parameter-signal output unit 12. Even though the engine starting section 15 receives the instruction for starting the engine from the transmitter, the engine starting section 15 does not start the engine if the vehicle-parameter signal, for example, does not satisfy the starting permission condition that a door or a hood is opened.

The engine-starting control section 16 controls the engine starting of the engine starting section 15 in response to the monitoring result from the power-source voltage monitoring section 13. The engine-starting control section 16 prohibits the engine starting section 15 from starting the engine if the engine-starting control section 16 receives the monitoring result, which indicates that the power source voltage of the battery is lower than a predetermined voltage from the power-source voltage monitoring section 13. That is, in this case, the engine-starting control section 16 prohibits the engine starting section 15 from starting the engine even if the parameter signal satisfies the starting permission condition and the instruction for starting the engine is received from the transmitter.

In addition, if the engine-starting control section 16 receives the monitoring result, which indicates that the power source voltage of the battery is lower than the predetermined voltage from the power-source voltage monitoring section 13, the engine-starting control section 16 notifies the monitoring result to the transmitter. When the transmitter receives the monitoring result, for example, the transmitter notifies the result to a user by turning on an LED (Light Emitting Diode) provided therein. Furthermore, the transmitter notifies the monitoring result from the power-source voltage monitoring section 13 to the user by turning on, for example, the hazard lamp 31.

Accordingly, if it is impossible to judge the starting permission condition based on the vehicle-parameter signal due to the decrease of the power source voltage of the battery, starting the engine can be prevented, so that it is possible to start the engine safely. For example, when the parameter signal, which indicates that the door or hood is closed, is output due to the drop of the power source voltage of the battery even though the door or the hood is opened, it is impossible to start the engine.

Furthermore, the engine-starting control section 16 may receive the monitoring result of the power-source voltage monitoring section 13 when the communication section 14 receives the instruction for starting the engine from the transmitter. In addition, the engine-starting control section 16 may not receive the monitoring result of the power source voltage of the battery after receiving the instruction for starting the engine from the transmitter, but may receive the monitoring result always or periodically. Moreover, upon receiving the monitoring result, which indicates that the power source voltage of the battery is lowered, the engine-starting control section 16 may transmit the monitoring result to the transmitter in advance.

Next, the operation of the remote vehicle starter 10 will be described by using a flow chart.

Figure 8:
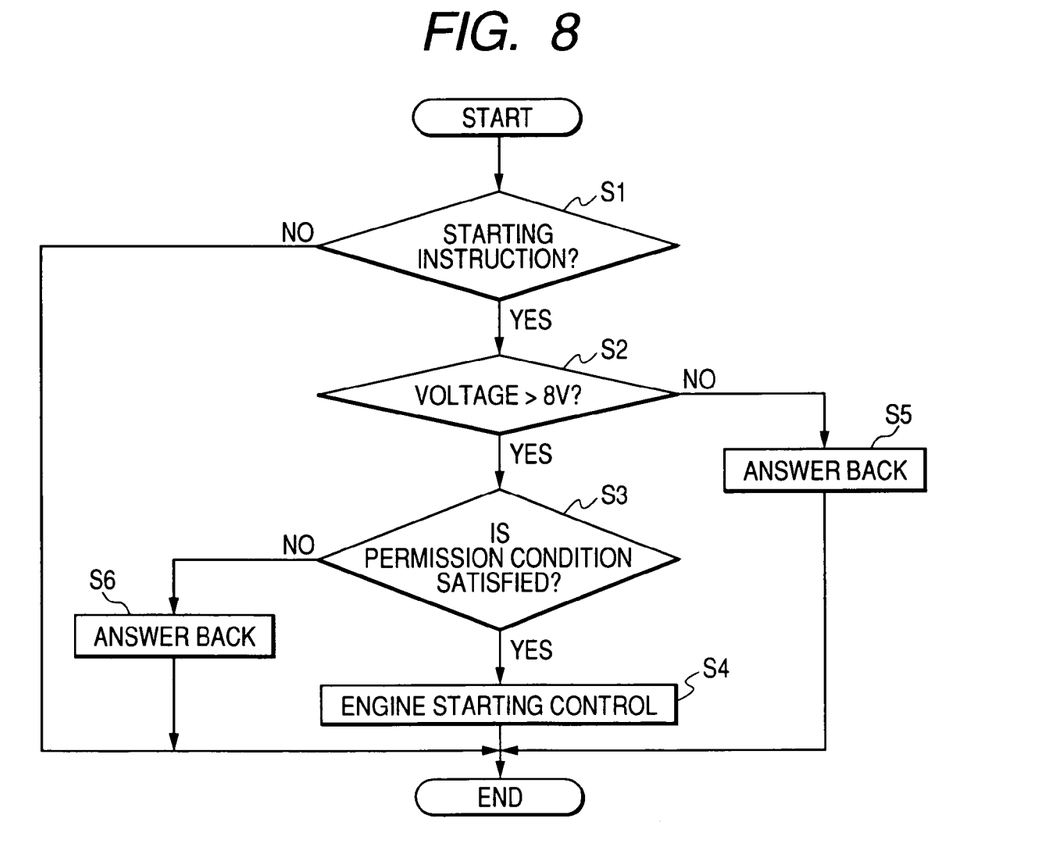
FIG. 8 is a flow chart in case of detecting the power source voltage of the battery when receiving the instruction for starting the engine, and executing the engine starting process.

FIG. 8 is a flow chart in case of detecting the power source voltage of the battery when receiving the instruction for starting the engine, and executing the engine starting process, and this process may be executed every 50 ms.

[Step S1] The remote vehicle starter 10 judges whether or not the instruction for starting the engine is received from the transmitter. If the instruction for starting the engine is received, proceed to step S2. If the instruction for starting the engine is not received, the engine starting process is not executed.

[Step S2] The remote vehicle starter 10 judges whether or not the power source of the battery is higher than 8V. If the power source voltage is higher than 8V, proceed to step S3. If the power source voltage is lower than 8V, proceed to step 55.

[Step S3] The remote vehicle starter 10 judges whether or not the vehicle-parameter signal satisfies the starting permission condition. If the vehicle-parameter signal satisfies the starting permission condition, proceed to step S4. If the vehicle-parameter signal does not satisfy the starting permission condition, proceed to step S6.

[Step S4] The remote vehicle starter 10 performs the control for starting the engine.

[Step S5] The remote vehicle starter 10 executes the answer-back process, which indicates that it is impossible to start the engine. For example, the remote vehicle starter 10 turns on the hazard lamp 31 shown in FIG. 6. Alternatively, the remote vehicle starter 10 transmits the information, which indicates that it is impossible to start the engine to the transmitter.

[Step S6] The remote vehicle starter 10 executes the answer-back process, which indicates that it is impossible to start the engine since the permission condition is not satisfied. This answer-back is implemented by a notification mode different from that in the answer-back of step S5. Accordingly, if the permission condition is not satisfied since the door is opened, a user knows from the answer-back described in step S6 that it is necessary to check the opening or closing state of the door or the hood. While, if the battery is not changed when the answer-back in step S5 is performed, it is known that it is impossible to remotely start the engine.

Figure 9:
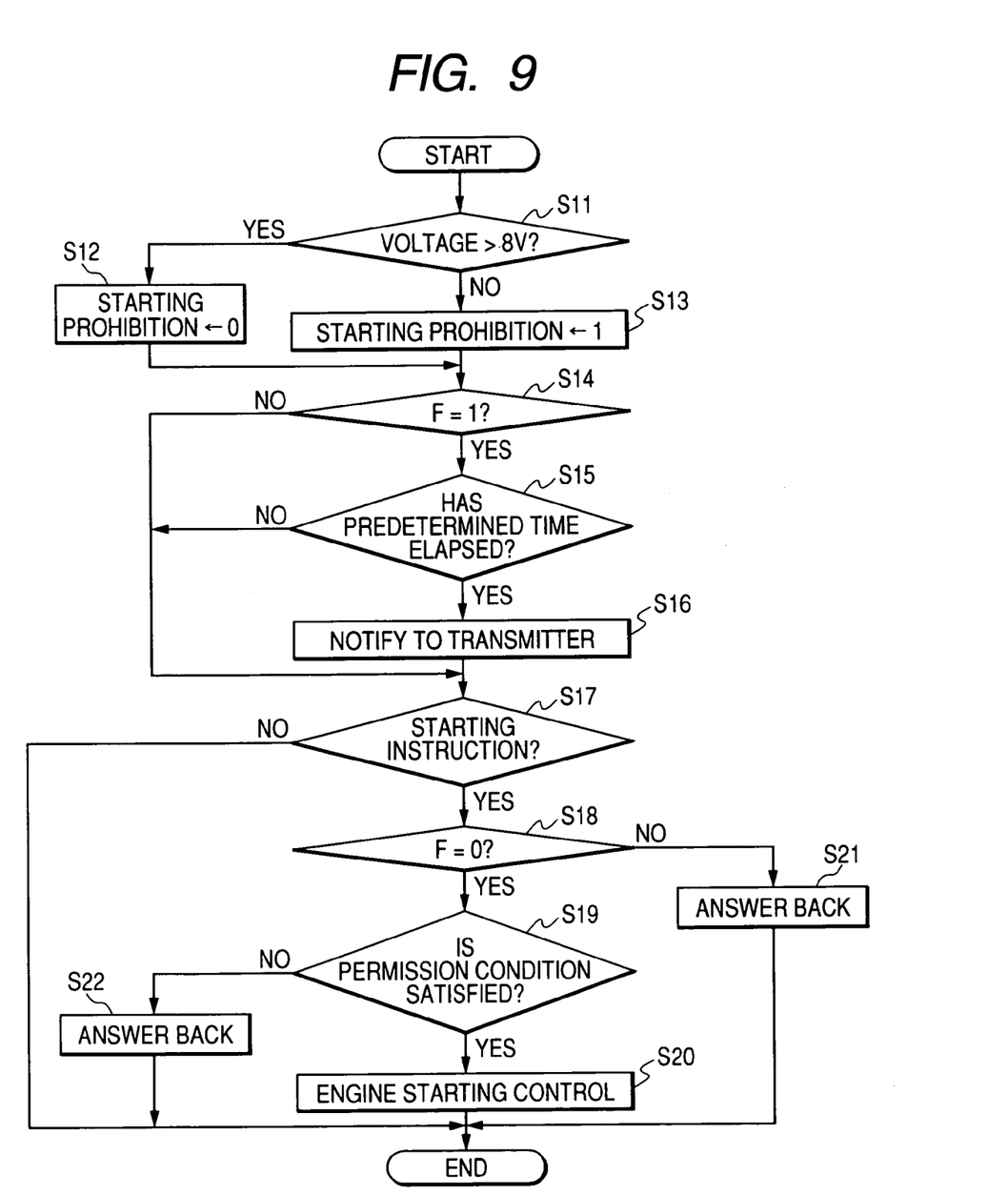
FIG. 9 is a flow chart in case of detecting the power source voltage of the battery before the instruction for starting the engine and executing the engine starting process.

FIG. 9 is a flow chart in case of detecting the power source voltage of the battery before the instruction for starting the engine and executing the engine starting process, and for example, this process may be executed every 50 ms.

[Step S11] The remote vehicle starter 10 judges whether or not the power source of the battery is higher than 8V. If the power source voltage of the battery is higher than 8V, proceed to step S12. If the power source voltage of the battery is not higher than 8V, proceed to step S13.

[Step S12] The remote vehicle starter 10 writes 0 (0: indicates that starting the engine is not prohibited.) in flag F, which indicates whether or not starting the engine is prohibited.

[Step S13] The remote vehicle starter 10 writes 1 (1: indicates that starting the engine is prohibited.) in flag F.

[Step S14] The remote vehicle starter 10 judges whether or not flag F is 1. If flag F is 1, proceed to step S15. If flag F is not 1, proceed to step S17.

[Step S15] The remote vehicle starter 10 judges whether or not a predetermined time, for example, 1 hour has elapsed. If the predetermined time has elapsed, proceed to step S16. If the predetermined time has not elapsed, proceed to step S17. That is, if flag F is 1 even after the predetermined time has elapsed, process at step S16 is executed as follows.

[Step S16] The remote vehicle starter 10 notifies that starting the engine is prohibited to the transmitter. Upon receiving the notification, the transmitter, for example, turns on LED provided therein, so that a user recognizes that starting the engine is prohibited.

[Step S17] The remote vehicle starter 10 judges whether or not the instruction for starting the engine is received from the transmitter. If the instruction for starting the engine is received, proceed to step S18. If the instruction for starting the engine is not received, the engine starting process is not executed.

[Step S18] The remote vehicle starter 10 judges whether or not flag F is 0. If flag F is 0, proceed to step S19. If flag F is not 0, proceed to step S21.

[Step S19] The remote vehicle starter 10 judges whether or not the vehicle-parameter satisfies the starting permission condition. If the vehicle-parameter satisfies the starting permission condition, proceed to step S20. If the vehicle-parameter does not satisfy the starting permission condition, proceed to step S22.

[Step S20] The remote vehicle starter 10 executes the control for starting the engine.

[Step S21] The remote vehicle starter 10 executes the answer-back process, which indicates that it is impossible to start the engine in the same manner as step S5. For example, the remote vehicle starter 10 turns on the hazard lamp 31 shown in FIG. 6.

[step S22] The remote vehicle starter 10 executes the same answer-back as at step S6.

As described above, the control of starting the engine has been executed in accordance with the power source voltage of the battery based on the vehicle-parameter signal. Accordingly, if the voltage of the vehicle-parameter signal decreases due to the decrease of the power source voltage of the engine and it is impossible to judge the starting permission condition properly, the remote vehicle starter 10 can prohibit the engine from starting, whereby the remote vehicle starter 10 can start the engine safely.

Furthermore, since the notification, which indicates that starting the engine is prohibited, is transmitted to the transmitter, it is possible that a user recognizes that something is wrong with the vehicle.

Next, a second embodiment according to the invention will be described in detail with reference to the drawings.

Figure 10:
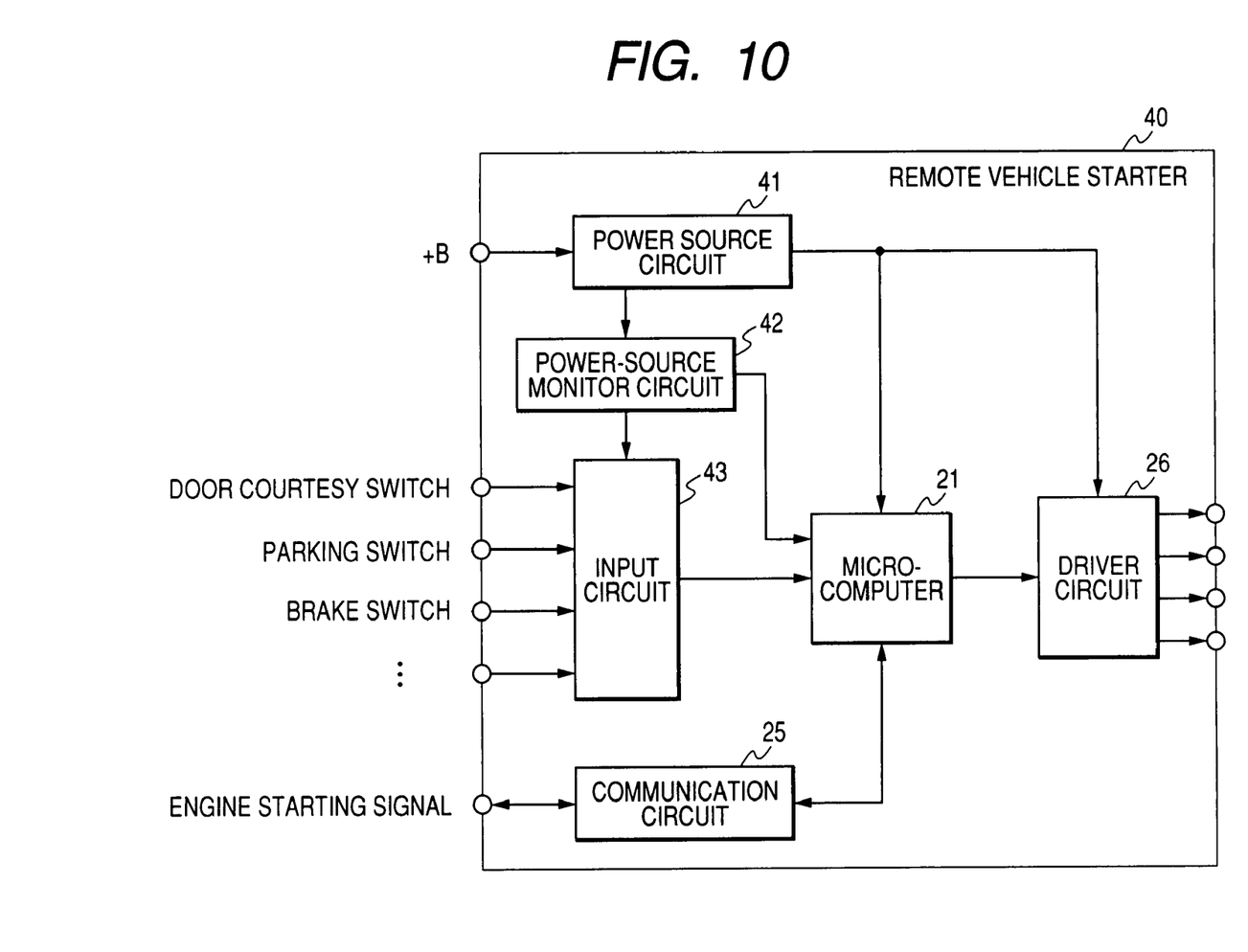
FIG. 10 shows an example of a system configuration of a remote vehicle starter in accordance with a second embodiment.

In the second embodiment, the remote vehicle starter 10 controls the engine starting by monitoring +B voltage of the battery input into the power source circuit.

FIG. 10 shows an example of a system configuration of the remote vehicle starter according to the second embodiment of the invention. In a remote vehicle starter 40 shown in FIG. 10, the same reference numeral is affixed to the same parts as FIG. 2 and the description thereof will be omitted.

+B voltage of the battery is input to a power source circuit 41. The power source circuit 41 outputs the input +B voltage of the battery to a power-source monitor circuit 42. Furthermore, the power source 41 allows +B voltage to be stably supplied to each circuit.

Figure 11:
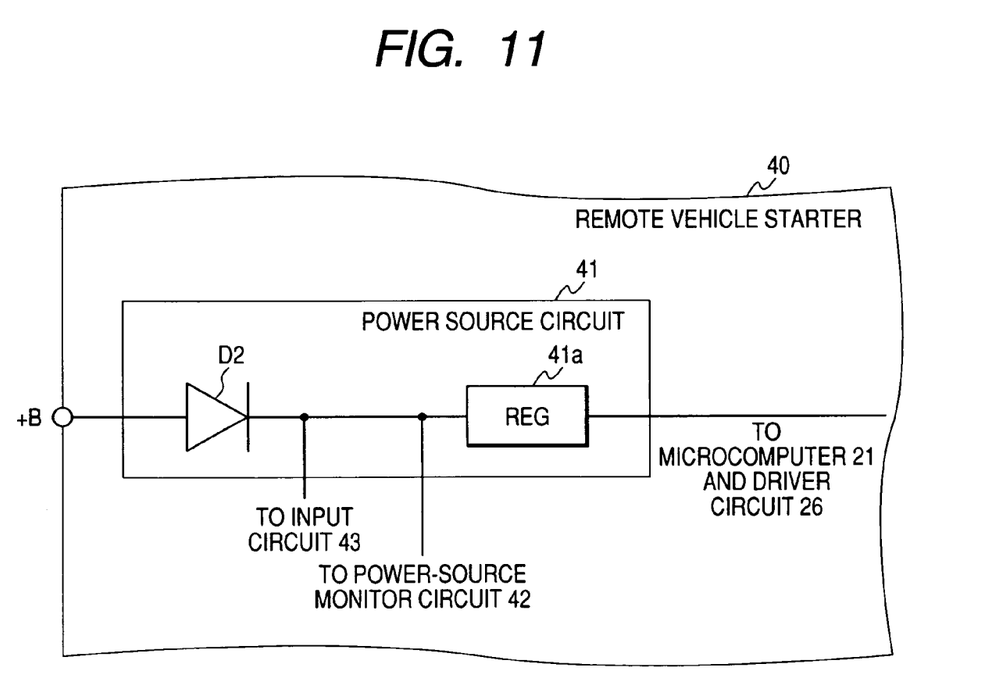
FIG. 11 is a detailed circuit diagram of a power source circuit.

Here, the power source circuit 41 is described in detail.

FIG. 11 is a detailed circuit diagram of the power source circuit. The power source circuit 41 shown in FIG. 11 has a diode D2 and a regulator 41*a* (REG in FIG. 11).

As shown in FIG. 11, +B voltage of the battery is input to an anode of the diode D2. A cathode of the diode D2 is connected to the regulator 41*a*. The diode D2 prohibits a current, which flows to a cathode side from flowing backward to battery side.

The regulator 41*a* makes +B voltage, which is output from the diode D2, to be constant and output it to the microcomputer 21 and the driver circuit 26. That is, the regulator 41*a* serves to supply a stable and constant power source voltage to the microcomputer 21 and the driver circuit 26.

The voltage of a node between the cathode of the diode D2 and the regulator 41*a* is supplied to the power-source monitor circuit 42. That is, the power-source monitor circuit 42 monitors the +B voltage of the battery. Furthermore, the voltage of the node between the cathode of the diode D2 and the regulator 41a is supplied to the input circuit 43. Whereby, the power-source monitor circuit 42 monitors the same voltage as the voltage supplied to the input circuit 43. In addition, with regard to the voltage supplied to the input circuit 43, the voltage of the node between the cathode of the diode D2 and the regulator 41a is monitored. Alternatively, the voltage of the node on the anode side of the diode D2 may be monitored.

In FIG. 11, although +B voltage is taken out of two points of the node between the cathode of the diode D2 and the regulator 41a and is output to the power-source monitor circuit 42 and the input circuit 43, respectively, +B voltage may be taken out of one point of the node between the cathode of the diode D2 and the regulator 41a and output to the power-source monitor circuit 42, and the power-source monitor circuit 42 may output +B voltage to the input circuit 43 as shown in FIG. 10.

Referring to FIG. 10 again, the +B voltage of the battery, which is input to the power source circuit 41, is input to the power-source monitor circuit 42. The power-source monitor circuit 42 monitors the +B voltage input to the power source circuit 41 and outputs a signal, which represents the monitoring result to the microcomputer 21.

The power-source monitor circuit 42 has the same circuit configuration as the power-source monitor circuit 24 except that the +B voltage is input to the resistance R11 of the power-source monitor circuit 24 in FIG. 5. The power-source monitor circuit 42 compares by means of the comparator the reference voltage generated by the reference voltage generating section with +B voltage obtained by dividing by resistances. If the power source voltage obtained by dividing by the resistances is lower than the reference voltage, the comparator, for example, outputs the signal of H state to the microcomputer 21. Furthermore, when the signal output from the power-source monitor circuit 42 is in H state, the microcomputer 21 judges that the vehicle-parameter signal output from the input circuit 43 cannot be judged properly as with the description on FIG. 2. Even if the instruction for starting the engine is received from the transmitter, the microcomputer does not start the engine.

The +B voltage, which is input to the power source circuit 41, is input to the input circuit 43. The input circuit 43 generates the vehicle-parameter signal, which represents the ON/OFF state of the switch, on the basis of the +B voltage and outputs the vehicle-parameter signal to the microcomputer 21. The input circuit 43 has the same circuit configuration as that of the input circuit 22 except that +B voltage is input to the diode D1 of the input circuit 22 in FIG. 3.

Accordingly, if the voltage of the vehicle-parameter signal goes down due to the decrease of the +B voltage and the starting permission condition cannot be properly judged, starting the engine can be prohibited, and the engine can be started safely.

Even though the example where the power-source monitor circuit is separate from the input circuit is explained, the present invention is not limited thereto. The input circuit may incorporate the power-source monitor circuit therein, so that the power source voltage value may be output from the input circuit as the vehicle-parameter signal.

What is claimed is:

1. A remote vehicle starter for allowing a user to start an engine of a vehicle remotely, the starter comprising:
a monitor that monitors a power source voltage value of a power source of the vehicle;
a parameter-signal generating unit that generates a vehicle-parameter signal using the power source;
a receiving unit that receives an instruction for starting the engine from a transmitter;
an engine starting unit that starts the engine when receiving the instruction for starting the engine from the receiving unit; and
a controller that controls the engine starting unit, wherein:
the controller allows the engine starting unit to start the engine when the monitored power source voltage value is more than a threshold value and the vehicle-parameter signal satisfies a starting permission condition;
the controller prohibits the engine starting unit to start the engine when the monitored power source voltage value is more than the threshold value and the vehicle-parameter signal does not satisfy the starting permission condition;
the controller prohibits the engine starting unit to start the engine when the monitored power source voltage value is equal to or less than the threshold value and the vehicle-parameter signal satisfies the starting permission condition;
when the receiving unit receives the instruction for starting the engine, the monitor monitors the power source voltage value; and
when the controller detects that the monitored power source voltage value decreases to the threshold value, the controller transmits a detection result to the transmitter.

2. A remote vehicle starter for allowing a user to start an engine of a vehicle remotely, the starter comprising:
a monitor that monitors a power source voltage value of a power source of the vehicle;
a parameter-signal generating unit that generates a vehicle-parameter signal using the power source;
a receiving unit that receives an instruction for starting the engine from a transmitter;
an engine starting unit that starts the engine when receiving the instruction for starting the engine from the receiving unit; and
a controller that controls the engine starting unit, wherein:
the controller allows the engine starting unit to start the engine when the monitored power source voltage value is more than a threshold value and the vehicle-parameter signal satisfies a starting permission condition;
the controller prohibits the engine starting unit to start the engine when the monitored power source voltage value is more than the threshold value and the vehicle-parameter signal does not satisfy the starting permission condition;
the controller prohibits the engine starting unit to start the engine when the monitored power source voltage value is equal to or less than the threshold value and the vehicle-parameter signal satisfies the starting permission condition;
the monitor always monitors the power source voltage value; and
when the controller detects that the monitored power source voltage value decreases to the threshold value, the controller transmits a detection result to the transmitter.

3. A remote vehicle starter for allowing a user to start an engine of a vehicle remotely, the starter comprising:
a monitor that monitors a power source voltage value of a power source of the vehicle;
a parameter-signal generating unit that generates a vehicle-parameter signal using the power source;
the receiving unit receives the instruction for starting the engine from a transmitter;

an engine starting unit that starts the engine when receiving the instruction for starting the engine from the receiving unit; and a controller that controls the engine starting unit, wherein:

the controller allows the engine starting unit to start the engine when the monitored power source voltage value is more than a threshold value and the vehicle-parameter signal satisfies a starting permission condition;

the controller prohibits the engine starting unit to start the engine when the monitored power source voltage value is more than the threshold value and the vehicle-parameter signal does not satisfy the starting permission condition;

the controller prohibits the engine starting unit to start the engine when the monitored power source voltage value is equal to or less than the threshold value and the vehicle-parameter signal satisfies the starting permission condition;

the monitor monitors the power source voltage value periodically; and when the controller detects that the monitored power source voltage value decreases to the threshold value, the controller transmits a detection result to the transmitter.

\* \* \* \* \*